US008698973B2

United States Patent
Wei (10) Patent No.: US 8,698,973 B2
(45) Date of Patent: Apr. 15, 2014

(54) LIQUID CRYSTAL DISPLAY AND METHOD OF DISASSEMBLING THE SAME

(75) Inventor: Xiao-Hui Wei, Suzhou (CN)

(73) Assignees: Au Optronics (Suzhou) Corp., Ltd., Suzhou (CN); Au Optronics Corp., Hsinchu (TW)

(*) Notice: Subject to any disclaimer, the term of this patent is extended or adjusted under 35 U.S.C. 154(b) by 69 days.

(21) Appl. No.: 13/240,362

(22) Filed: Sep. 22, 2011

(65) Prior Publication Data

US 2012/0169959 A1  Jul. 5, 2012

(30) Foreign Application Priority Data

Dec. 30, 2010  (CN) .......................... 2010 1 0624760

(51) Int. Cl.
*G02F 1/1333* (2006.01)
(52) U.S. Cl.
USPC ............................................... 349/58; 349/60
(58) Field of Classification Search
USPC ..................................... 349/58, 60
See application file for complete search history.

(56) References Cited

U.S. PATENT DOCUMENTS

| 7,830,470 B2* | 11/2010 | Liu ................................ 349/58 |
| 2006/0268190 A1 | 11/2006 | Yu et al. |
| 2009/0147174 A1* | 6/2009 | Ha et al. ......................... 349/58 |

FOREIGN PATENT DOCUMENTS

| JP | 11133420 | 5/1999 |
| JP | 2009265237 | 11/2009 |

OTHER PUBLICATIONS

Translation of JP 11133420.*
Translation of JP 2009265237.*

* cited by examiner

Primary Examiner — Michael Caley
Assistant Examiner — Kendrick Hsu
(74) Attorney, Agent, or Firm — WPAT, PC; Justin King (57) ABSTRACT

A liquid crystal display and a method of disassembling the same are disclosed. The liquid crystal display comprises a plastic frame, an optical film, a LCD panel and a double-sided tape. The plastic frame comprises two inner walls and two loading planes. The two inner walls respectively form a first accommodation space and a second accommodation space in communication mutually. One side of the double-sided tape respectively adheres the optical film, the other inner wall and the two loading planes, and the other side thereof adheres the LCD panel, and the optical film and the LCD panel are together installed in the plastic frame.

11 Claims, 10 Drawing Sheets

LIQUID CRYSTAL DISPLAY AND METHOD OF DISASSEMBLING THE SAME

RELATED APPLICATIONS

This application claims priority to Chinese Application Serial Number 201010624760.1, filed Dec. 30, 2010, which is herein incorporated by reference.

BACKGROUND

1. Technical Field

The present invention relates to a liquid crystal display, especially to a liquid crystal display (LCD) and a method of disassembling the same.

2. Description of Related Art

In general, a liquid crystal display is installed with a double-sided adhesive light-shielding tape sandwiched between a backlight module and a LCD panel. Two sides of the double-sided adhesive light-shielding tape are respectively adhered on the backlight module and the LCD panel for not only shielding the edges of the backlight module to avoid light leaking but also for preventing the friction happened between the LCD panel and the backlight module to avoid optical films of the backlight module being scratched and the display quality of the liquid crystal display is affected.

In the process of production and testing, an operator may have to repeatedly assemble and disassemble the liquid crystal display. Since the LCD panel is installed in an plastic frame and is adhered by the double-sided adhesive light-shielding tape, thus, for disassembling the LCD, the operator has to press the plastic frame, such that the plastic frame generates deformation and a corner of a LCD panel is exposed from the plastic frame. So the operator can remove the LCD panel from the double-sided adhesive light-shielding tape so as to be released from the plastic frame.

However, since the backlight module is adhered on the other side of the double-sided adhesive light-shielding tape, in the process of disassembling the LCD, the double-sided adhesive light-shielding tape would be pulled or stretched to cause the relative locations of the backlight module and the LCD panel are deviated, and each optical film of the backlight module may therefore be damaged and the topmost optical film may be scratched; or even, when the LCD panel of the disassembled LCD is very thin in thickness, the LCD panel may be damaged or even broken, so that defective products are produced and the production cost is wasted.

SUMMARY

The present invention discloses a liquid crystal display and a method of disassembling the same, such that in the process of disassembling the LCD, avoid a backlight module being moved when the LCD panel is removed, so as to reduce the possibilities of the deviation of the backlight module, to avoid each optical film of the backlight module being damaged and the topmost optical film of the backlight module being scratched.

The present invention discloses a liquid crystal display and a method of disassembling the same, such that in the process of disassembling the LCD panel, the possibility of a plastic frame being overly pressed and not able to be recovered is reduced.

The present invention discloses a liquid crystal display and a method of disassembling the same, such that in the process of disassembling the LCD panel, the possibility of the LCD panel being damaged or broken during the LCD panel being bended is reduced.

According to one embodiment of the present invention, a liquid crystal display is provided. The liquid crystal display comprises a plastic frame, an optical film, a LCD panel and a double-sided tape. The plastic frame comprises a first inner wall, a second inner wall, a first loading plane and a second loading plane. The first inner wall surrounds to form a first accommodation space therein. The second inner wall surrounds to form a second accommodation space therein. The second accommodation space and the first accommodation space are in communication, and the second accommodation space is larger than the first accommodation space. The first loading plane is respectively adjacent to the first inner wall and the second inner wall. The second loading plane is adjacent to the second inner wall and extended outwardly from the second accommodation space. The LCD panel is received in the second accommodation space and stacked on the first loading plane. The double-sided tape comprises an enclosing part and a first protruding part. The enclosing part has a first central opening therein. The first protruding part is adjacent to the outer edge of one corner of the enclosing part. Two opposite sides of the double-sided tape are respectively defined as a first adhering surface and a second adhering surface. The second adhering surface adheres the LCD panel, the first adhering surface of the enclosing part adheres the optical film and the first loading plane, the first adhering surface of the first protruding part adheres the second inner wall and the second loading plane.

According to one embodiment of the present invention, the double-sided tape further comprises a second protruding part. The first adhering surface of the second protruding part adheres on the second inner wall and the second loading plane. The second protruding part and the first protruding part are respectively adjacent to the outer edges of two neighboring corners of the enclosing part.

According to one embodiment of the present invention, the double-sided tape further comprises a second protruding part. The first adhering surface of the second protruding part adheres on the second inner wall and the second loading plane. The second protruding part and the first protruding part are respectively adjacent to the outer edges of two opposite diagonal corners of the enclosing part.

According to one embodiment of the present invention, the double-sided tape further comprises a second protruding part. The first adhering surface of the second protruding part adheres on the second inner wall and the second loading plane. The second protruding part and the first protruding part are respectively adjacent to the outer edges of two neighboring sides of the corner of the enclosing part.

According to one embodiment of the present invention, the double-sided tape further comprises a second protruding part. The first adhering surface of the second protruding part adheres on the second inner wall and the second loading plane. The second protruding part is adjacent to the outer edge of the enclosing part and disposed between two neighboring corners of the enclosing part.

According to one embodiment of the present invention, the liquid crystal display further comprises a metal frame. The metal frame is formed with a second central opening therein. The metal frame covers on the plastic frame, and the LCD panel is exposed from the second central opening.

According to one embodiment of the present invention, the plastic frame further comprises a protrusion disposed at the outer edge of the second loading plane and protruded towards a direction opposite to the first loading plane.

According to one embodiment of the present invention, the protrusion is abutted against the metal frame, such that a gap is maintained between the metal frame and the second loading plane.

According to one embodiment of the present invention, the backlight module further comprises a flexible circuit board. The enclosing part of the double-sided tape has two sides with respect to the first central opening and the two sides have different widths, the first adhering surface of the wider side is adhered with the flexible circuit board.

According to one embodiment of the present invention, the double-sided tape consists of a base strip and a first adhering layer and a second adhering layer disposed on two opposite surfaces of the base strip, the first adhering surface is the surface of the first adhering layer, the second adhering surface is the surface of the second adhering layer. The base strip is directly exposed on the surface of the first protruding part opposite to the second loading plane.

According to one embodiment of the present invention, the double-sided tape is an adhering layer, and a first adhering surface and a second adhering surface are two opposite surfaces of the adhering layer. The surface of the first protruding part opposite to the second loading plane is pasted and covered with a release film.

The present invention provides a method of disassembling the LCD panel, with respect to the liquid crystal display according to the mentioned embodiments of the present invention, and the LCD panel is installed in the mentioned liquid crystal display. The method of disassembling the liquid crystal display comprises two steps as followings. A first step is to press the portion of the first protruding part corresponding to the second loading plane, so the plastic frame is deformed, and at this moment the first adhering surface of the double-sided tape still adheres the optical film and the plastic frame, with the deformation of the plastic frame, one corner of the LCD panel is released from the second adhering surface of the double-sided tape. A second step is to lift the released corner of the LCD panel till the LCD panel is totally removed from the double-sided tape.

According to one embodiment of the present invention, when the second protruding part and the first protruding part of the mentioned double-sided tape are respectively adjacent to the outer edges of two neighboring corners of the enclosing part, the step of pressing the portion of the first protruding part corresponding to the second loading plane further comprises a step of synchronously pressing the portion of the first protruding part corresponding to the second loading plane and the portion of the second protruding part corresponding to the second loading plane.

According to one embodiment of the present invention, when the second protruding part and the first protruding part of the mentioned double-sided tape are respectively adjacent to the outer edges of two opposite diagonal corners of the enclosing part, the step of pressing the portion of the first protruding part corresponding to the second loading plane further comprises a step of synchronously pressing the portion of the first protruding part corresponding to the second loading plane and the portion of the second protruding part corresponding to the second loading plane.

According to one embodiment of the present invention, when the second protruding part and the first protruding part of the mentioned double-sided tape are respectively adjacent to the outer edges of two neighboring sides of a corner of the enclosing part, the step of pressing the portion of the first protruding part corresponding to the second loading plane further comprises a step of synchronously pressing the portion of the first protruding part corresponding to the second loading plane and the portion of the second protruding part corresponding to the second loading plane.

According to one embodiment of the present invention, when the second protruding part and the first protruding part of the mentioned double-sided tape are respectively adjacent to the outer edge of the enclosing part and disposed between two neighboring corners of the enclosing part, the step of pressing the portion of the first protruding part corresponding to the second loading plane further comprises a step of synchronously pressing the portion of the first protruding part corresponding to the second loading plane and the portion of the second protruding part corresponding to the second loading plane.

According to one embodiment of the present invention, the step of lifting the released corner of the LCD panel further comprises a step of lifting the LCD panel along an opposite diagonal corner direction relative to the corner of the LCD panel.

According to one embodiment of the present invention, before the step of pressing the portion of the first protruding part corresponding to the second loading plane, further comprises removing a metal frame of the liquid crystal display.

According to one embodiment of the present invention, during the period of lifting the corner of the LCD panel till totally removing the LCD panel, further comprises a step of inserting a release sheet between a portion of the LCD panel released from the second adhering surface, and the second adhering surface of the double-sided tape.

According to what is mentioned above, with the liquid crystal display and the method of disassembling the LCD, during the period of disassembling the LCD panel, the LCD panel can be easily removed so as to facilitate rework, and the backlight module and panel can be further protected, so the additional cost relative to the deviation conditions of the backlight module is greatly saved and the production cost is prevented from being wasted.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

Many modifications and other embodiments of the inventions set forth herein will come to mind to one skilled in the art to which these inventions pertain having the benefit of the teachings presented in the below descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

When disassembling a LCD panel from a liquid crystal display, the optical film adhered by a double-sided tape may be deviated, damaged or scratched because the double-sided tape is pulled. One solution provided by the present invention is that a part of the double-sided tape is extended to the edge of a plastic frame, so the double-sided tape is prevented from being deviated through the disassembly of a LCD, and a backlight module is prevented from being subject to the mentioned phenomenon.

Figure 1:
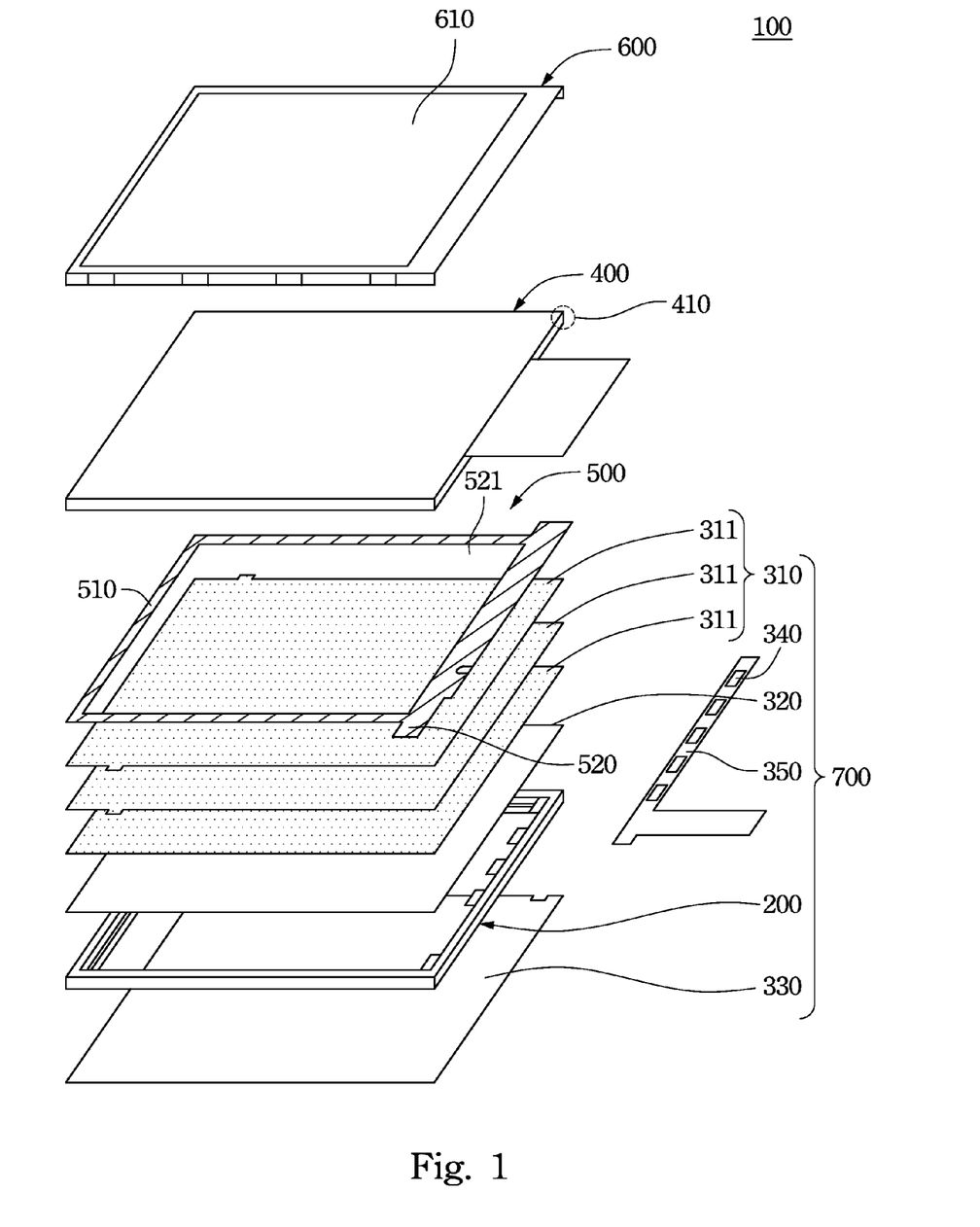
FIG. 1 is a schematic exploded view showing the liquid crystal display according to the present invention.
Figure 2:
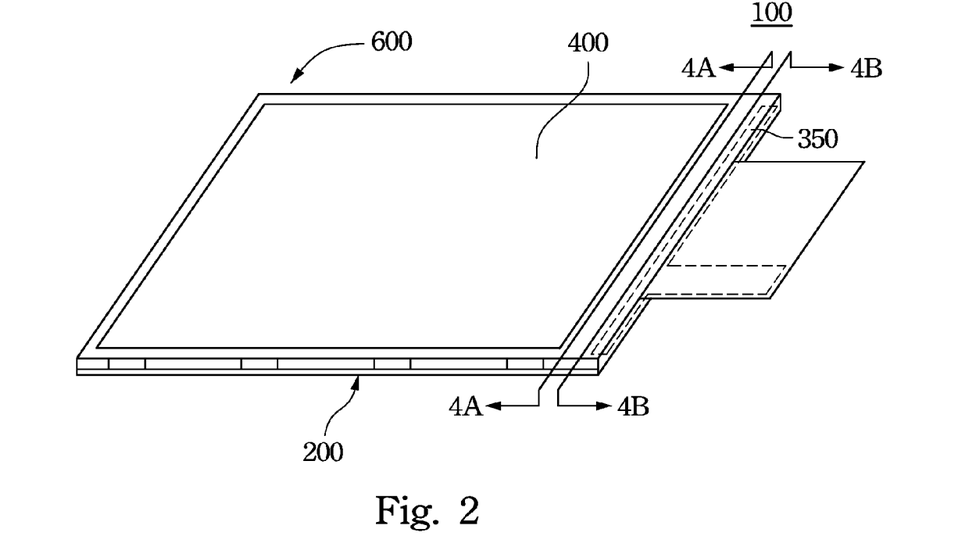
FIG. 2 is a schematic view showing the assembly of the liquid crystal display according to the present invention.

Refer to FIG. 1 and FIG. 2, wherein FIG. 1 is a schematic exploded view showing the liquid crystal display according to the present invention, and FIG. 2 is a schematic view showing the assembly of the liquid crystal display according to the present invention.

According to one embodiment, a liquid crystal display 100 is provided. The liquid crystal display 100 comprises a backlight module 700, a LCD panel 400, a double-sided tape 500 and a metal frame 600. The backlight module 700 comprises a plastic frame 200, an optical film set 310, a light guide plate 320 and a reflection sheet 330. Two sides of the double-sided tape 500 are respectively adhered on the backlight module 700 and the LCD panel 400, and the optical film set 310, the double-sided tape 500 and the LCD panel 400 are in sequence staked in the plastic frame 200. The mental frame 600 covers on an outer surface of the plastic frame 200 and exposes the LCD panel 400 therein.

Figure 3:
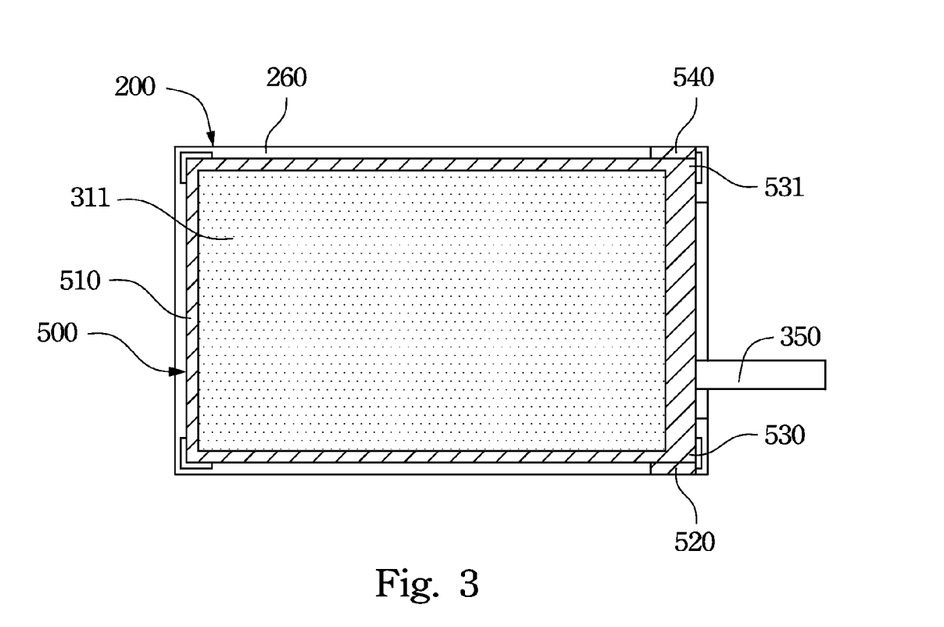
FIG. 3 is a schematic top view in which the metal frame and the LCD panel of FIG. 2 being abridged, according to one embodiment of the present invention.
Figure 4A:
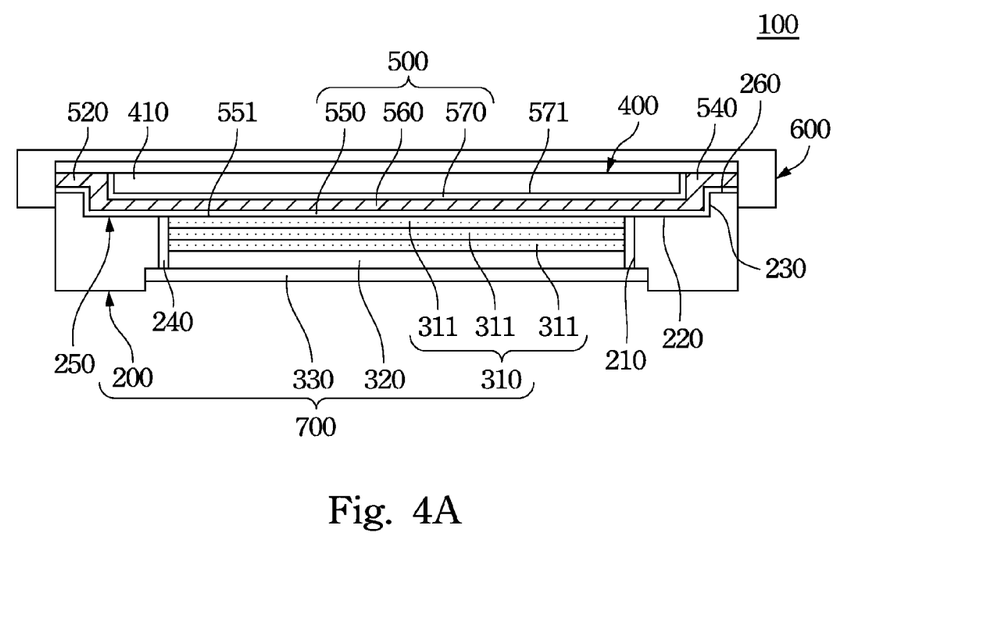
FIG. 4A is a cross sectional view taken along a 4A-4A line of FIG. 2.

Refer to FIG. 3 and FIG. 4A, wherein FIG. 3 is a schematic top view in which the metal frame and the LCD panel of FIG. 2 being abridged, according to one embodiment of the present invention; FIG. 4A is a cross sectional view taken along a 4A-4A line of FIG. 2.

Substantially, the plastic frame 200 is a frame body with a hollow rectangular opening, and comprises a first inner wall 210, a first loading plane 220 and a second inner wall 230. The first inner wall 210 of the plastic frame 200 surrounds a first accommodation space 240 therein. The second inner wall 230 of the plastic frame 200 surrounds a second accommodation space 250 therein. The second accommodation space 250 is in communication with the first accommodation space 240. Because the first inner wall 210 is closer to the center of the backlight module 700 relative to the second inner wall 230, the second accommodation space 250 is larger than the first accommodation space 240 in volume. The first loading plane 220 is defined between the first inner wall 210 and the second inner wall 230, and two opposite sides of the first loading plane 220 are respectively adjacent to the first inner wall 210 and the second inner wall 230.

Moreover, the plastic frame 200 is further formed with a second loading plane 260 on the second inner wall 230 along a direction opposite to the second accommodation space 250. In other words, the second loading plane 260 is adjacent to one side of the second inner wall 230 and outwardly extended. The second loading plane 260 is defined as the outer part of the plastic frame 200. The second loading plane 260 is substantially parallel to the first loading plane 220.

The optical film set 310, the light guide plate 320 and the reflection sheet 330 can be received in the first accommodation space 240. The optical film set 310, the light guide plate 320 and the reflection sheet 330 can be in sequence stacked in the first accommodation space 240, and the reflection sheet 330 is further apart away from the double-sided tape 500 relative to the optical film set 310.

Figure 4B:
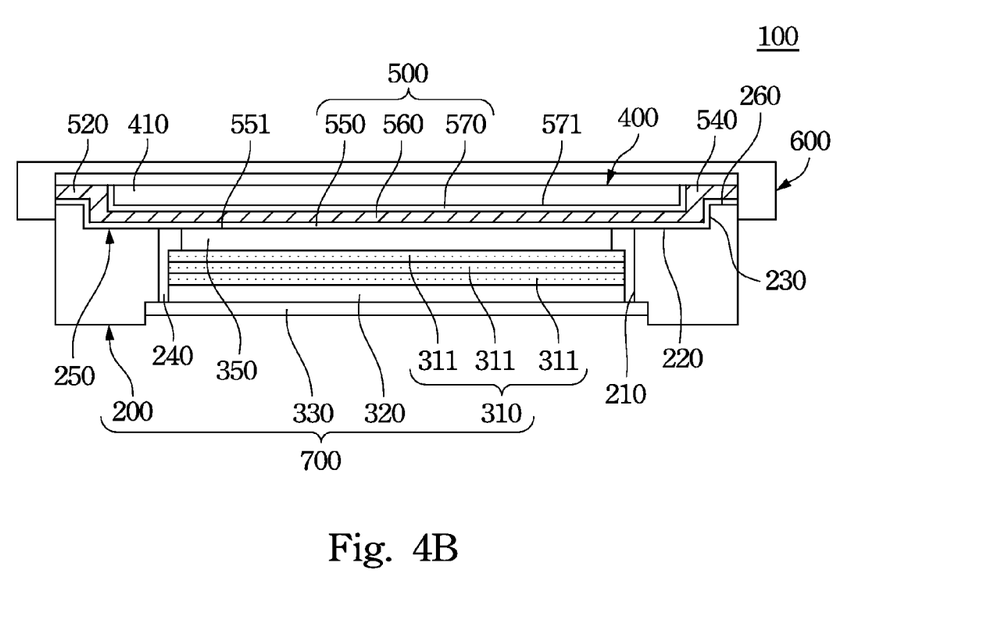
FIG. 4B is a cross sectional view taken along a 4B-4B line of FIG. 2.

What shall be defined is that the optical film set 310 consists of an optical film 311 or a plurality of optical films 311 stacking on each other. The liquid crystal display 100 can comprise a flexible circuit board 350 and a plurality of light emitting units 340 which can be installed on the flexible circuit board 350 (as shown in FIG. 4B). The light emitting units 340 can be arranged correspondingly to one side of the light guide plate 320 so as to emit lights towards the light guide plate 320. What shall be addressed is that a side-type backlight module is adopted in this embodiment of the present invention for a purpose of illustration, but a direct-type backlight module can also be adopted in this embodiment of the present invention in actual use.

The LCD panel 400 is received in the second accommodation space 250 and is stacked on the first loading plane 220 by the double-sided tape 500. The LCD panel 400 is in a rectangular shape having four corners 410 in which each corner 410 is formed by two neighboring sides.

The metal frame 600 can be formed with a second central opening 610 therein. The metal frame 600 covers on the plastic frame 200 for reinforcing and enhancing the structure of the plastic frame 200, and the metal frame 600 exposes the LCD panel 400 through the second central opening 610.

Viewing from the front side of the double-sided tape 500 (i.e. FIG. 3), the double-sided tape 500 comprises an enclosing part 510 and a first protruding part 520. The enclosing part 510 is substantially in a hollow rectangular shape, and formed with a first central opening 521 (as shown in FIG. 1). The enclosing part 510 has plural corners 530, each corner is formed through two adjacent sides. The first protruding part 520 is disposed at the outer edge of the enclosing part 510 relative to the first central opening 521, preferably disposed adjacent to the outer edge of one corner 530 of the enclosing part 510, i.e. the first protruding part 520 is integrally extended from the outer edge of the corner 530 of the enclosing part 510 towards a direction away from the first central opening 521.

Figure 5A:
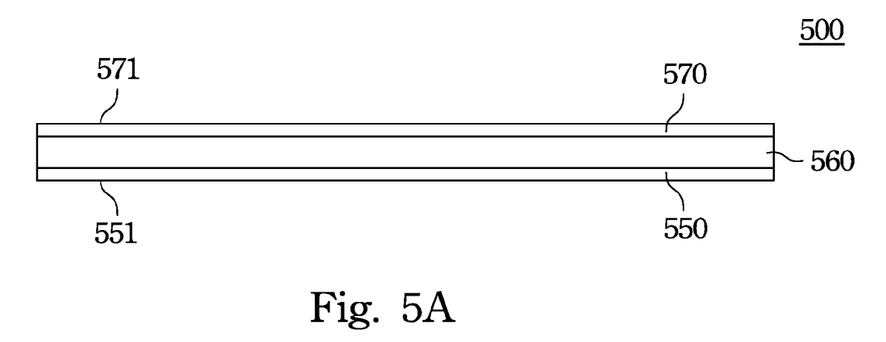
FIG. 5A is a schematic view showing the double-sided tape according to one embodiment of the present invention.
Figure 5B:
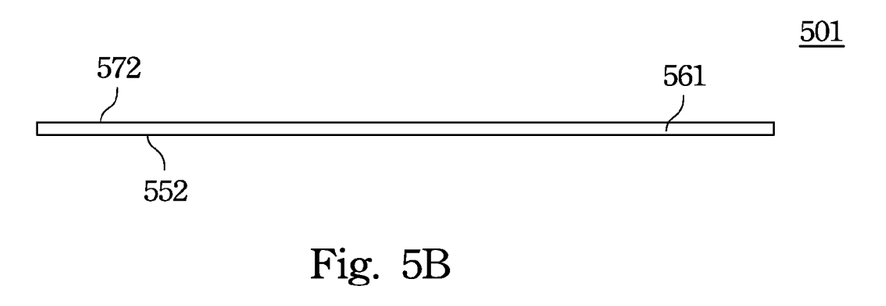
FIG. 5B is a schematic view showing the double-sided tape according to another embodiment of the present invention.

Refer to FIG. 5A and FIG. 5B, wherein FIG. 5A is a schematic view showing the double-sided tape according to one embodiment of the present invention; FIG. 5B is a schematic view showing the double-sided tape according to another embodiment of the present invention.

According to the present invention, the double-sided tape adopted in the embodiments can be different. As shown in FIG. 5A, the double-sided tape 500 is flexible and consists of a first adhering layer 550, a base strip 560 and a second adhering layer 570. The first adhering layer 550 and the second adhering layer 570 are disposed at two opposite sides of the base strip 560; or as shown in FIG. 5B, the double-sided tape 501 is flexible and mainly composed of an adhering layer 561. Two opposite sides of the adhering layer 561 are respectively formed with a first adhering surface 552 and a second adhering surface 572.

Accordingly, as shown in FIG. 4A, when laterally viewing the double-sided tape 500, the double-sided tape 500 is flexible so as to be installed in the plastic frame 200 after being bended and adhered. In details, the first adhering surface 551 is the surface of the first adhering layer 550, and the second adhering surface 571 is the surface of the second adhering layer 570.

In the assembly of the LCD panel 400 and the backlight module 700 through the double-sided tape 500, one side of the double-sided tape 500 is adhered on the LCD panel 400 through the second adhering surface 571 formed on the surface of the second adhering layer 570; the other side of the double-sided tape 500 is synchronously adhered on the optical film 311 and the first loading plane 220 through the first adhering surface 551 formed on the surface of the first adhering layer 550 of the enclosing part 510, and after the first adhering layer 550 of the first protruding part 520 being bended and guided along the surfaces of the second inner wall 230 and the second loading plane 260, then adhered on the second inner wall 230 and the second loading plane 260 through the first adhering surface 551 formed on the surface of the first adhering layer 550.

Moreover, refer to FIG. 3 and FIG. 4B, wherein FIG. 4B is a cross sectional view taken along a 4B-4B line of FIG. 2. According to another embodiment of the present invention, the plural sides of the enclosing part 510 of the double-sided tape 500 are not totally in the same width with respect the first central opening 521 (as shown in FIG. 3), wherein one wider side (shown as the side where the enclosing part 510 being connected with the flexible circuit board 350 in FIG. 1 or the side where the enclosing part 510 being connected with the flexible circuit board 350 in FIG. 3) can adhere the optical film 311 (FIG. 4A) and the flexible circuit board 350 (FIG. 4B) through the first adhering surface 551 formed on the surface of the first adhering layer 550.

Refer to FIG. 4A and FIG. 4B, when the metal frame 600 covers on one surface of the plastic frame 200, the location of the first protruding part 520 corresponding to the second loading plane 260 may be in contact with the inner surface of the metal frame 600, if an adhering layer is remained, the metal frame 600 may be adhered on the second adhering surface 571. So when the metal frame 600 covers on the plastic frame 200, the second adhering layer 570 of the surface of the first protruding part 520 opposite to the second loading plane 260 can be omitted, i.e. the surface of the first protruding part 520 opposite to the second loading plane 260 is directly exposed on the base strip 560, so the first protruding part 520 is prevented from adhering on the inner surface of the metal frame 600. As such the disassembly of the LCD 100 can be facilitated.

Moreover, the means for preventing the metal frame 600 from being adhered is not limited to remove the second adhering layer 570 from the first protruding part 520, so even if the first protruding part 520 is provided with the second adhering layer 570, the surface of the first protruding part 520 opposite to the second loading plane 260 can be pasted and covered with a release film (not shown) which does not have the adhering property, such that the first protruding part 520 can be prevented from being adhered on the inner surface of the metal frame 600.

Figure 6:
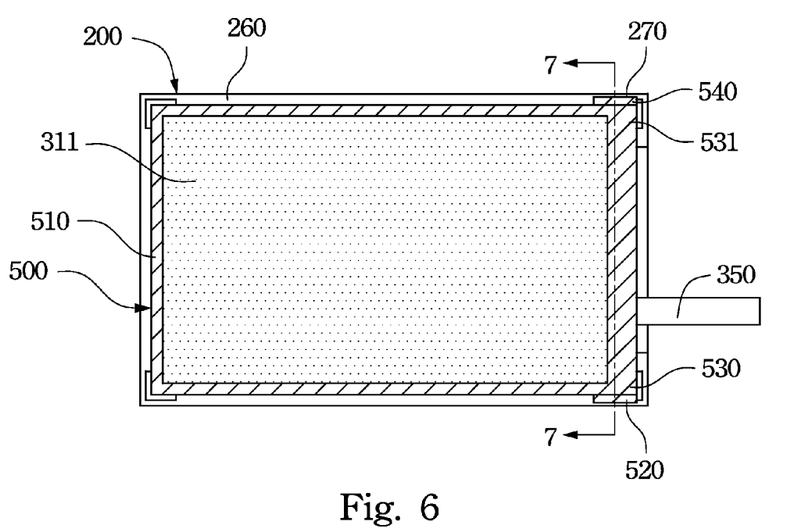
FIG. 6 is a schematic top view in which the metal frame and the LCD panel being abridged according to the another embodiment of the present invention.
Figure 7:
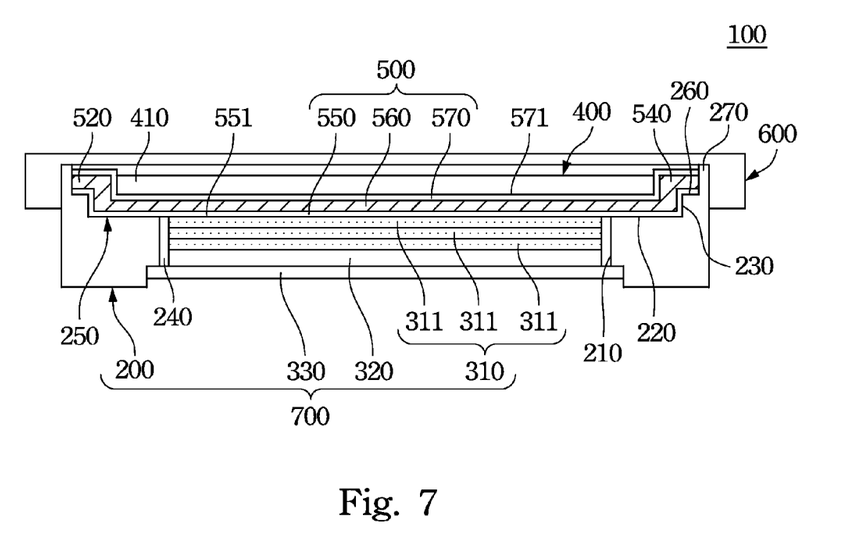
FIG. 7 is a cross sectional view taken along a 7-7 line of FIG. 6.

Refer to FIG. 6 and FIG. 7, wherein FIG. 6 is a schematic top view in which the metal frame and the LCD panel being abridged according to one another embodiment of the present invention; FIG. 7 is a cross sectional view taken along a 7-7 line of FIG. 6. What shall be addressed is that FIG. 6 shows the metal frame 600 and the LCD panel 400 are omitted for illustration, instead of removing the metal frame 600 and the LCD panel 400, so FIG. 7 still shows the metal frame 600 and the LCD panel 400.

According to the one another embodiment, the plastic frame adopts the plastic frame 200 shown in FIG. 3 and FIG. 4A, but the plastic frame 200 further comprises a protrusion 270 arranged at the outer edge of the second loading plane 260 and protruded in a direction opposite to the first loading plane 220. When the metal frame 600 covers on the surface of the plastic frame 200, because the protrusion 270 is abutted against the metal frame 600, a gap is maintained between the metal frame 600 and the second loading plane 260, i.e. the metal frame 600 is not in contact with the first protruding part 520 on the second loading plane 260.

As such, due to the protrusion 270, the metal frame 600 and the second loading plane 260 are not in contact, so even if the surface of the first protruding part 520 opposite to the second loading plane 260 is provided with the second adhering layer 570 (as shown in FIG. 7), and the inner surface of the metal frame 600 is prevented from being adhered with the second adhering surface 571 of the second adhering layer 570 of the first protruding part 520, so the disassembly of the LCD 100 can be facilitated.

Figure 8:
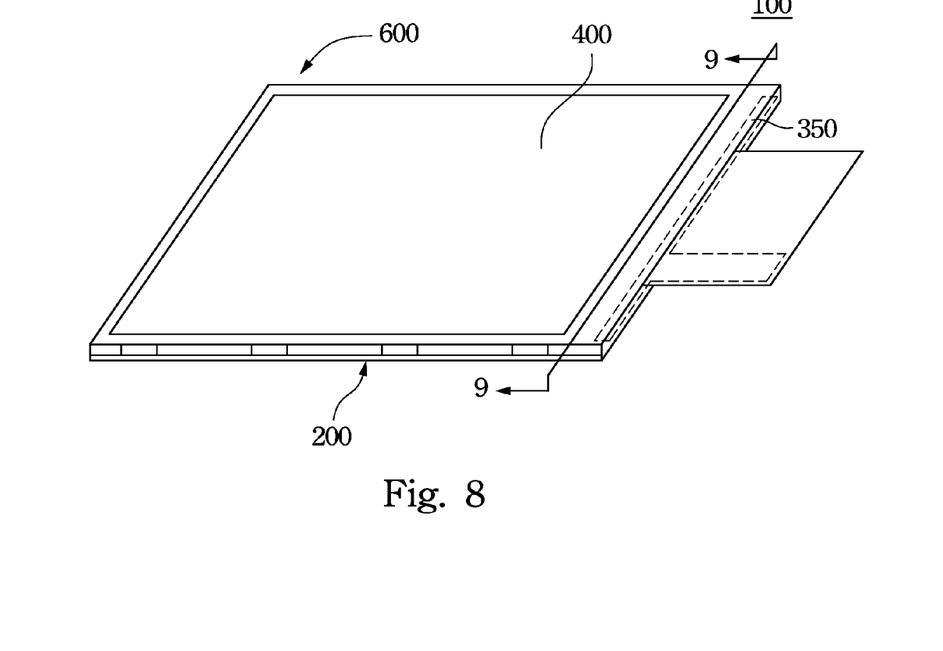
FIG. 8 is a schematic top view in which the metal frame and the LCD panel being abridged according to still one another embodiment of the present invention.
Figure 9:
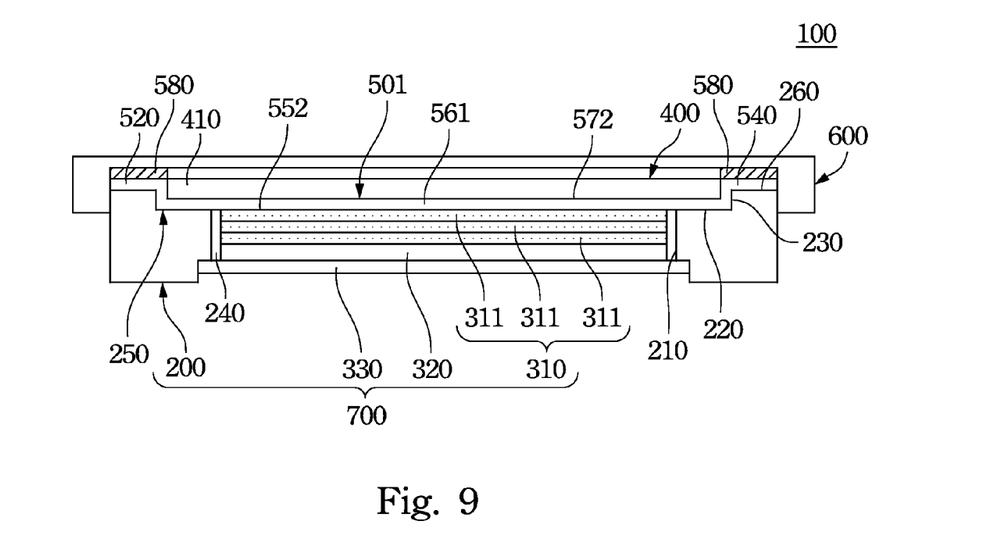
FIG. 9 is a cross sectional view taken along a 9-9 line of FIG. 8.

Refer to FIG. 8 and FIG. 9, wherein FIG. 8 is a schematic top view in which the metal frame and the LCD panel being abridged according to still one another embodiment of the present invention; FIG. 9 is a cross sectional view taken along a 9-9 line of FIG. 8.

What shall be addressed is that FIG. 8 shows the liquid crystal display 100 in which the metal frame 600 and the LCD panel 400 are omitted for illustration, instead of removing the metal frame 600 and the LCD panel 400, so FIG. 9 still shows the metal frame 600 and the LCD panel 400.

According to the still one another embodiment, the plastic frame adopts the plastic frame 200 shown in FIG. 3 and FIG. 4A, and the double-sided tape 501 of FIG. 5B is adopted in FIG. 8.

So when the metal frame 600 covers on one surface of the plastic frame 200, the location of the first protruding part 520 corresponding to the second loading plane 260 may be in contact with the inner surface of the metal frame 600, and the metal frame 600 may be adhered on the second adhering surface 572 of the double-sided tape 501. As such, the surface of the first protruding part 520 opposite to the second loading plane 260 is partially pasted and covered with a release film 580, so the metal frame 600 can be prevented from being adhered on the second adhering surface 572 through the release film 580, thus the disassembly of the LCD 100 can be facilitated.

Refer to FIG. 3, according to the another embodiment of the present invention, the double-sided tape 500 further comprises a second protruding part 540 adjacent to the outer edge of another corner 531 of the enclosing part 510, preferably the first protruding part 520 and the second protruding part 540 are respectively adjacent to the outer edges of the two neighboring corners 530, 531 of the enclosing part 510.

Refer to FIG. 10A to FIG. 10D, wherein FIG. 10A to FIG. 10D are schematic views showing the alternatives of the double-sided tape of the liquid crystal display according to this embodiment of the present invention.

Figure 10A:
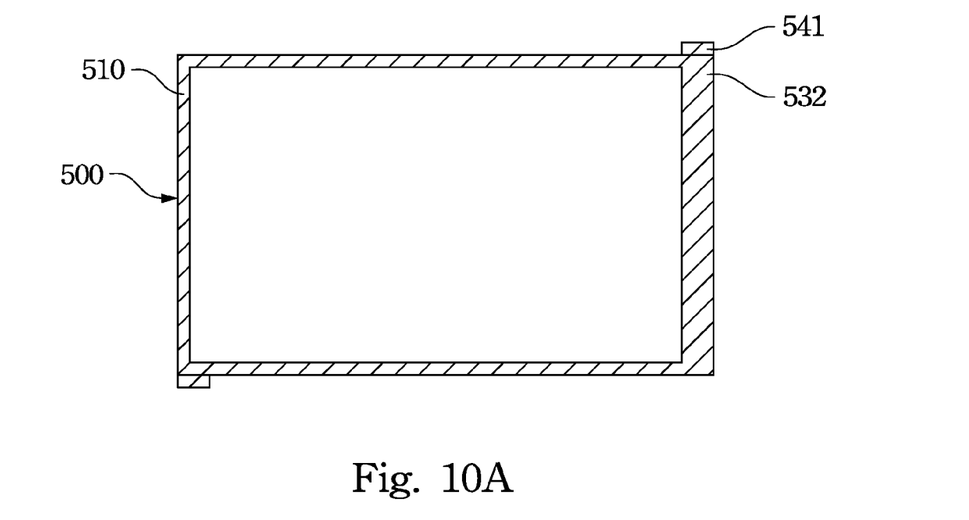
FIG. 10A to FIG. 10D are schematic views showing the alternatives of the double-sided tape of the liquid crystal display according to this embodiment of the present invention.

Refer to FIG. 10A, according to one another embodiment of the present invention, the double-sided tape 500 further comprises a second protruding part 541 adjacent to the outer edge of one another corner 532 of the enclosing part 510, preferably the first protruding part 520 and the second protruding part 541 are respectively adjacent to the outer edges of two diagonal corners 530, 532 of the enclosing part 510.

Figure 10B:
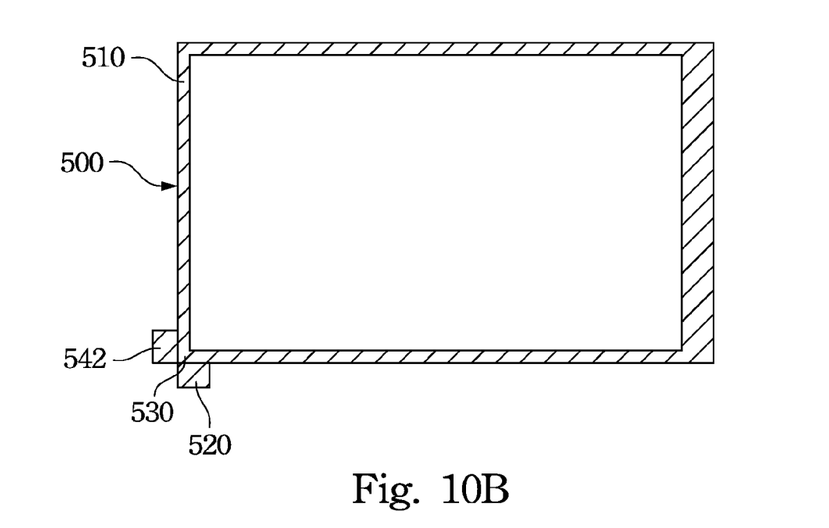

Refer to FIG. 10B, according to one another embodiment of the present invention, the double-sided tape 500 further comprises a second protruding part 542 adjacent to the outer edge of one corner 530 of the enclosing part 510, preferably the first protruding part 520 and the second protruding part 542 are respectively adjacent to the outer edges of two neighboring sides of the same corner 530 of the enclosing part 510.

Figure 10C:
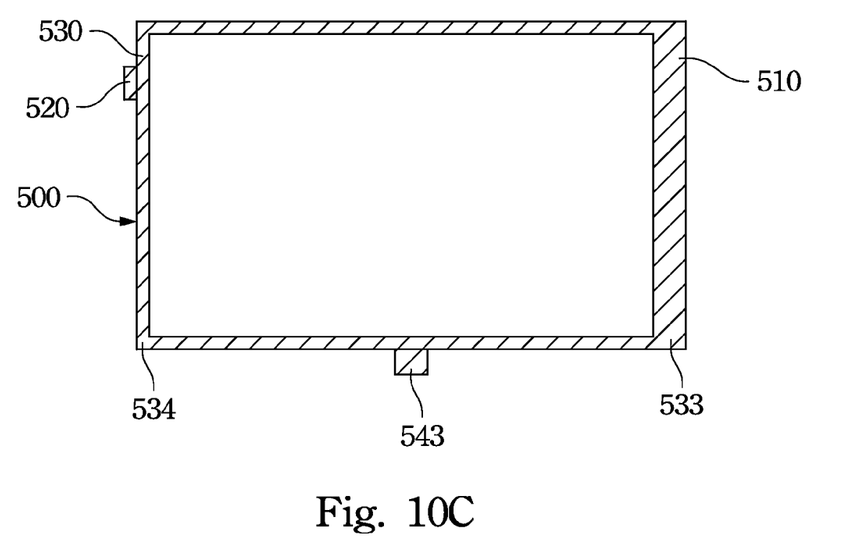

Refer to FIG. 10C, according to one another embodiment of the present invention, the double-sided tape 500 further comprises a second protruding part 543 adjacent to the outer edge of the enclosing part 510, preferably the second protruding part 543 is respectively adjacent to the outer edge of the enclosing part 510 and disposed between two neighboring corners 533, 534 of the enclosing part 510.

Figure 10D:
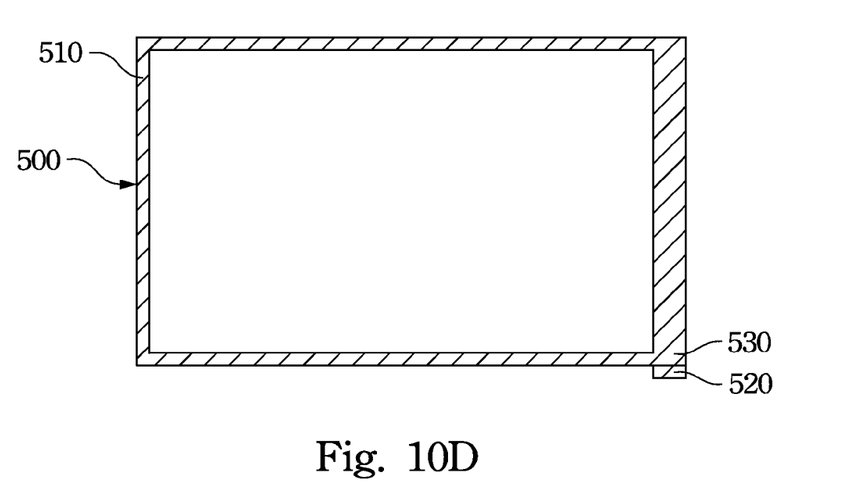

Refer to FIG. 10D, according to one another embodiment of the present invention, the double-sided tape 500 can only has the first protruding part 520 and no other protruding part is provided.

Figure 11:
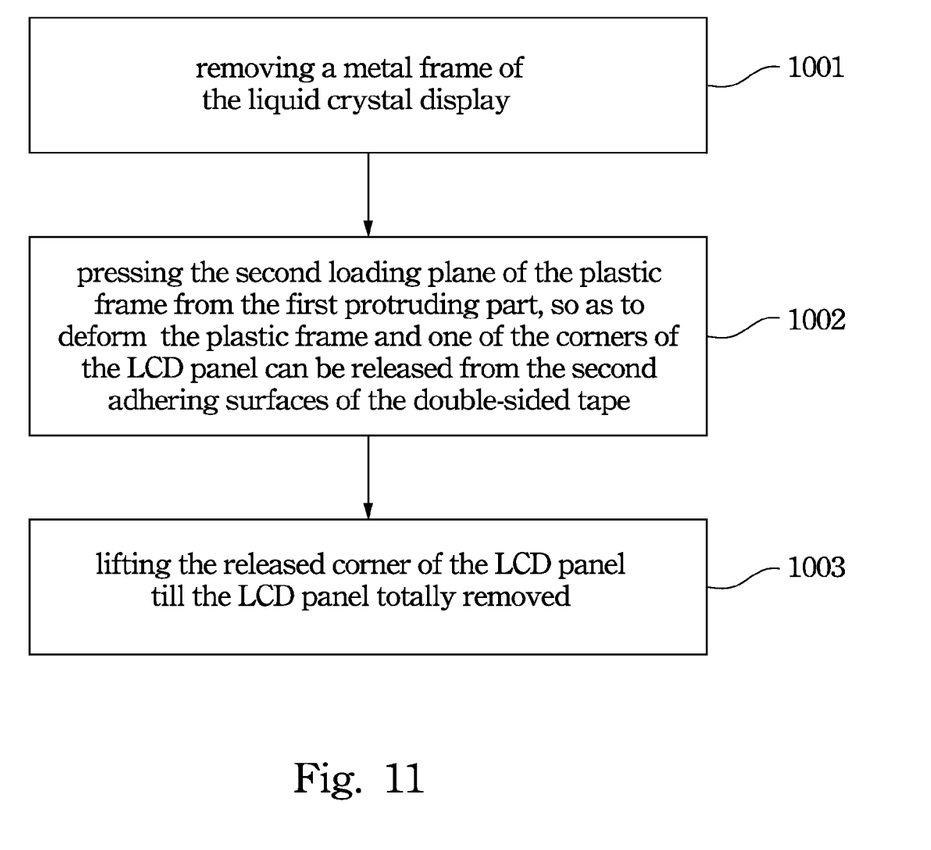
FIG. 11 is a chart flow showing the method of disassembling a LCD panel according to one embodiment of the present invention.
Figure 12A:
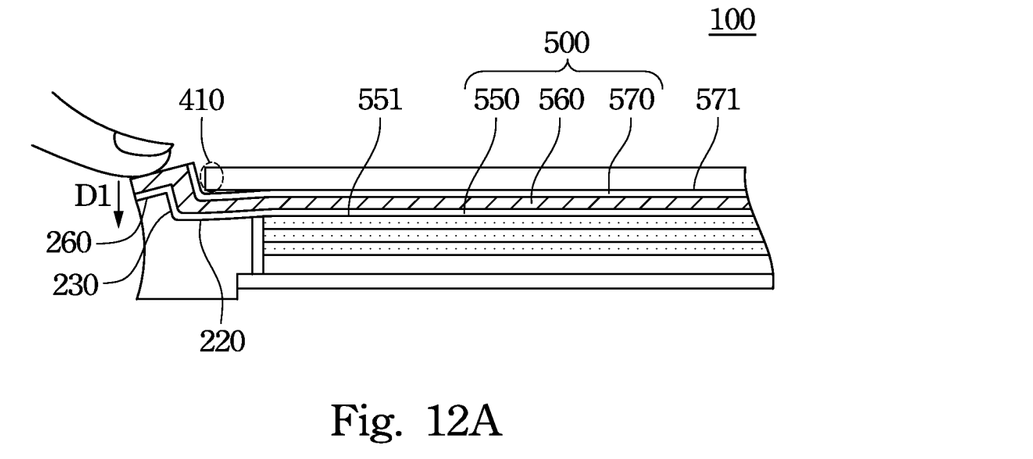
FIG. 12A is schematic view showing the operation according to the step (1002) of the method of disassembling the LCD panel according to the present invention.
Figure 12B:
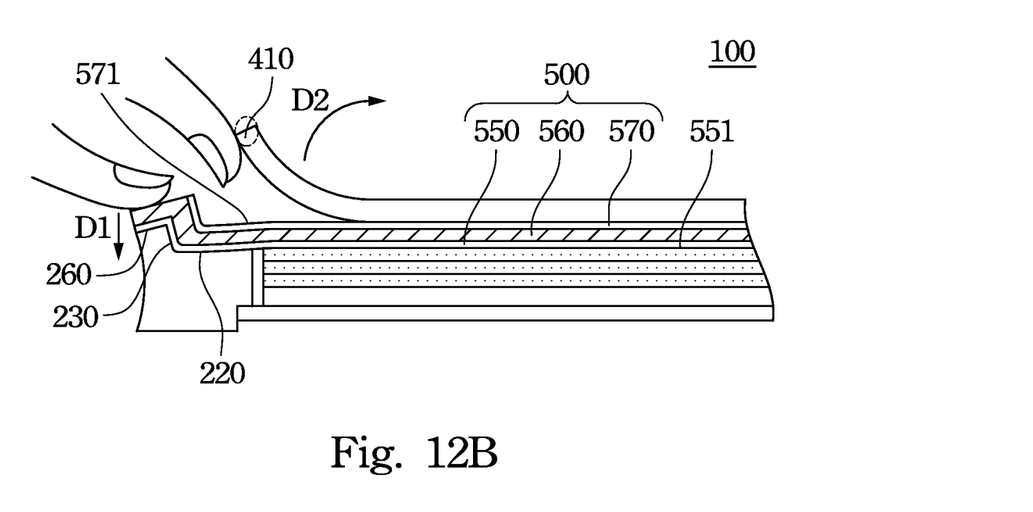
FIG. 12B is schematic view showing the operation according to the step (1003) of the method of disassembling the LCD panel according to the present invention.

Refer to FIG. 11 to FIG. 12B, wherein FIG. 11 is a chart flow showing the method of disassembling a LCD according to one embodiment of the present invention; FIG. 12A is schematic view showing the operation according to the step (1002) of the method of disassembling the LCD according to the present invention; FIG. 12B is schematic view showing the operation according to the step (1003) of the method of disassembling the LCD according to the present invention.

After fully disclosing the liquid crystal display 100 according to the present invention, a method of disassembling the liquid crystal display 100 disclosed in the abovementioned embodiments, which comprises the steps of:

STEP (1001): removing a metal frame 600 of the liquid crystal display 100 (as shown in FIG. 2 and FIG. 4A).

In this step, for disassembling the liquid crystal display 100, an operator has to detach the metal frame 600 covered on the plastic frame 200, so the whole LCD panel 400 is exposed, and the double-sided tape 500 is disposed at the first protruding part 520 of the second loading plane 260.

As what is mentioned above, the surface of the first protruding part 520 opposite to the second loading plane 260 allows to be not provided with the second adhering layer 570 (as shown in FIG. 4A); or the second adhering layer 570 of the first protruding part 520 opposite to the second loading plane 260 can be pasted and covered with a release film; or the second adhering surface 572 of the first protruding part 520 opposite to the second loading plane 260 can be pasted and covered with the release film 580 (as shown in FIG. 9); or the second loading plane 260 is prevented from being in contact with the metal frame 600 through the protrusion 270 (as shown in FIG. 7). So when the operator detaches the metal frame 600 from the plastic frame 200, the metal frame 600 is not adhered by the second adhering surfaces 571, 572 of the double-sided tape 500, so the disassembly of the LCD 100 is facilitated.

However, if the liquid crystal display 100 is not covered with the metal frame 600, and the LCD panel 400 is desired to be removed, then the method of disassembling the LCD 100 can be started to process from step (1002).

STEP (1002): pressing the second loading plane 260 of the plastic frame 200 through the first protruding part 520, so the plastic frame 200 being deformed and one of the corners 410 of the LCD panel 400 being released from the second adhering surfaces 571, 572 of the double-sided tape 500.

In this step, Refer to FIG. 12A, the operator presses the portion of the first protruding part 520 corresponding to the second loading plane 260, such that the pressed location of the plastic frame 200 is recessed towards a first direction D1 for generating deformation, and the corner 410 of the LCD panel 400 is released from the second adhering surface 571 of the double-sided tape 500; at this moment, the first adhering surface 551 of the double-sided tape 500 is still adhered with the optical film 311 of the backlight module 700, the flexible circuit board 350 and the second inner wall 230 and the first loading plane 220 of the plastic frame 200.

STEP (1003): lifting the released corner 410 of the LCD panel 400 till the LCD panel 400 is totally removed.

In this step, the operator lifts the corner 410 of the LCD panel 400 which is released from the second adhering surface 571 towards a D2 direction until the LCD panel 400 is totally removed from the second adhering surface 571 of the double-sided tape 500 (as shown in FIG. 12B).

At this moment, the D2 direction can be a diagonal corner direction relative to the corner 410 of the LCD panel 400 for lifting the LCD panel 400.

At this moment, because the operator presses the portion of the first protruding part 520 opposite to the first loading plane 220, when the LCD panel 400 is released from the second adhering surface 571 of the double-sided tape 500, the double-sided tape 500 is prevented from being pulled by the LCD panel 400 so deviation is avoided, such that the optical film 311 and the flexible circuit board 350 (as shown in FIG. 4B) adhered on the first adhering surface 551 of the double-sided tape 500 are prevented from being moved, so the possibilities of the optical film 311 of the backlight module 700 being deviated, damaged or scratched are reduced.

As one another embodiment of the mentioned method, Refer to FIG. 3, FIG. 10A to FIG. 10D, when the double-sided tape 500 is further comprising the second protruding parts 540, 541, 542, 543, no matter the second protruding part 540, 541, 542, 543 and the first protruding part 520 are respectively adjacent to the outer edges of two neighboring corners 530, 531 of the enclosing part 510, or respectively adjacent to the outer edges of two opposite diagonal corners 530, 532 of the enclosing part 510, or respectively adjacent to the outer edges of two neighboring sides of a same corner 530 of the enclosing part 510, or the second protruding part 543 is adjacent to the outer edge of the enclosing part 510 and disposed between two neighboring corners 530, 533 of the enclosing part 510, when the operator wants to remove the LCD panel 400 according to the mentioned method of disassembling, the step (1002) further comprises synchronously pressing the portion of the first protruding part 520 corresponding to the second loading plane 260 and the portion of the second protruding part 540, 541, 542, 543 corresponding to the second loading plane 260, so a larger portion of the LCD panel 400 can be released from the second adhering surface 571.

As one another embodiment of the mentioned method, in the step (1003), during the period of lifting the corner 410 of the LCD panel 400 till totally removing the LCD panel 400, a release sheet (not shown) can be inserted between a portion of the LCD panel 400 released from the second adhering surface 571, and the second adhering surface 571 of the double-sided tape 500, so the second adhering surface 571 of the double-sided tape 500 is prevented from adhering on the released portion of the LCD panel 400 again.

According to what is mentioned above, with the liquid crystal display and the method of disassembling the liquid crystal display provided by the present invention, during the period of disassembling the LCD, the LCD panel can be easily removed so as to facilitate rework, and the backlight module and glass can be further protected, so the additional cost relative to the replacement of a broken backlight module element is greatly saved and the production cost is prevented from being wasted.

Although the present invention has been described with reference to the preferred embodiments thereof, it is apparent to those skilled in the art that a variety of modifications and changes may be made without departing from the scope of the present invention which is intended to be defined by the appended claims.

The readers attention is directed to all papers and documents which are filed concurrently with this specification and which are open to public inspection with this specification, and the contents of all such papers and documents are incorporated herein by reference.

All the features disclosed in this specification (comprising any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A liquid crystal display, comprising:
    a plastic frame comprising:
        a first inner surface surrounding to form a first accommodation space therein;
        a second inner surface surrounding to form a second accommodation space therein, wherein the second inner surface and the first inner surface are substantially parallel and non-coplanar with each other, the second accommodation space is in communication with the first accommodation space, and is larger than the first accommodation space;
        a first loading plane connected to both of the first inner surface and the second inner surface;
        a second loading plane defined as an outer surface of the plastic frame connected to the second inner surface and extended outwardly, wherein the second inner surface, the second loading plane and the first loading plane are non-coplanar with each other, and the second inner surface is disposed between the second loading plane and the first loading plane;
    an optical film received in the first accommodation space;
    a LCD panel disposed in the second accommodation space and stacked on the first loading plane; and
    a double-sided tape comprising an enclosing part and a first protruding part, wherein the enclosing part has a first central opening, the first protruding part is adjacent to the outer edge of a corner of the enclosing part, two opposite sides of the double-sided tape are respectively defined as a first adhering surface and a second adhering surface, wherein the second adhering surface adheres to the LCD panel, the first adhering surface of the enclosing part adheres to the optical film and the first loading plane, the first adhering surface of the first protruding part is bended to adhere to the second inner surface and the second loading plane.

2. The liquid crystal display according to claim 1, wherein the double-sided tape further comprises a second protruding part, the first adhering surface of the second protruding part is adapted to adhere on the second inner surface and the second loading plane, the second protruding part and the first protruding part are respectively adjacent to outer edges of two neighboring corners of the enclosing part.

3. The liquid crystal display according to claim 1, wherein the double-sided tape further comprises a second protruding part, the first adhering surface of the second protruding part is adapted to adhere on the second inner surface and the second loading plane, the second protruding part and the first protruding part are respectively adjacent to the outer edges of two diagonal corners of the enclosing part.

4. The liquid crystal display according to claim 1, wherein the double-sided tape further comprises a second protruding part, the first adhering surface of the second protruding part is adapted to adhere on the second inner surface and the second loading plane, the second protruding part and the first protruding part are respectively adjacent to outer edges of two neighboring sides of the corner of the enclosing part.

5. The liquid crystal display according to claim 1, wherein the double-sided tape further comprises a second protruding part, the first adhering surface of the second protruding part is adapted to adhere on the second inner surface and the second loading plane, the second protruding part is adjacent to an outer edge of the enclosing part and disposed between two neighboring corners of the enclosing part.

6. The liquid crystal display according to claim 1 further comprising:
    a metal frame having a second central opening, and the metal frame covering on the plastic frame, and the LCD panel is exposed from the second central opening.

7. The liquid crystal display according to claim 6, wherein the plastic frame further comprises:
    a protrusion disposed at the outer edge of the second loading plane and protruded towards a direction opposite to the first loading plane.

8. The liquid crystal display according to claim 7, wherein the protrusion is abutted against the metal frame, such that a gap is maintained between the metal frame and the second loading plane.

9. The liquid crystal display according to claim 1 further comprising a flexible circuit board, wherein the enclosing part has two sides with respect to the first central opening and the two sides have different widths, the first adhering surface of the wider side is adapted to adhere with the flexible circuit board.

10. The liquid crystal display according to claim 1, wherein the double-sided tape comprises a base strip, a first adhering layer and a second adhering layer overlaid on two opposite surfaces of the base strip, the first adhering surface is a surface of the first adhering layer, the second adhering surface is a surface of the second adhering layer; wherein the base strip is directly exposed at the surface of the first protruding part opposite to the second loading plane.

11. The liquid crystal display according to claim 1, wherein the double-sided tape is an adhering layer, and the first adhering surface and the second adhering surface are two opposite surfaces of the adhering layer, wherein a surface of the first protruding part opposite to the second loading plane is pasted and covered with a release film.

* * * * *